United States Patent [19]
Fulton

[11] 3,827,388
[45] Aug. 6, 1974

[54] SHIP PROPULSION SYSTEM

[75] Inventor: William H. Fulton, Chelmsford, Mass.

[73] Assignee: Fulton Projects, Inc., Chelmsford, Mass.

[22] Filed: June 1, 1971

[21] Appl. No.: 148,568

[52] U.S. Cl. ................................ 115/11, 114/67 A
[51] Int. Cl..... B63h 11/00, B63h 11/12, B63b 1/34
[58] Field of Search........... 114/67 A, 67 R; 115/11, 115/15

[56] References Cited
UNITED STATES PATENTS

| 955,214 | 4/1910 | Schroeder | 114/67 A |
| 1,412,848 | 4/1922 | Durajeff | 114/67 A |
| 1,877,380 | 9/1932 | Baldwin | 114/67 A |
| 3,606,857 | 9/1971 | Sundquist | 114/67 A |

FOREIGN PATENTS OR APPLICATIONS

| 832,255 | 1/1952 | Germany | 114/67 A |

Primary Examiner—George E. A. Halvosa
Assistant Examiner—Sherman D. Basinger
Attorney, Agent, or Firm—Pearson & Pearson

[57] ABSTRACT

An elongated water borne vessel is propelled forwardly with substantially less horse power than required by conventional propeller driven ships by means of a series of upwardly rising steps extending from full depth at the ship bottom rearwardly to just below the water line proximate the stern. Compressed air is delivered to the bottommost step for propelling the ship forwardly and then rising and expanding up each successive step to continue to exert forward thrust. Boundary surfaces along the sides of the steps prevent sidewise escape of the air bubble occupying each step.

7 Claims, 5 Drawing Figures

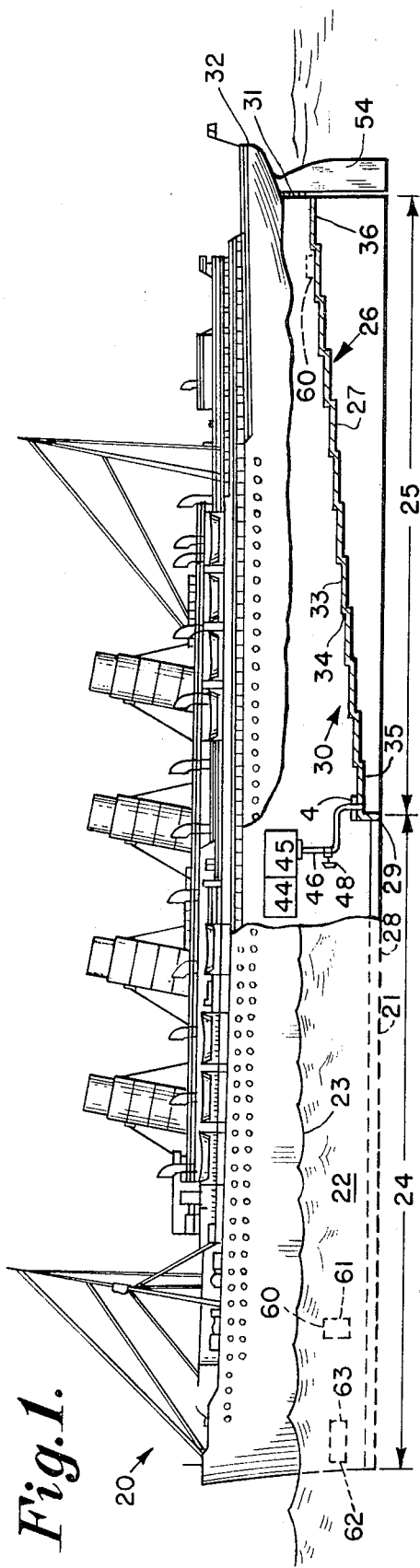
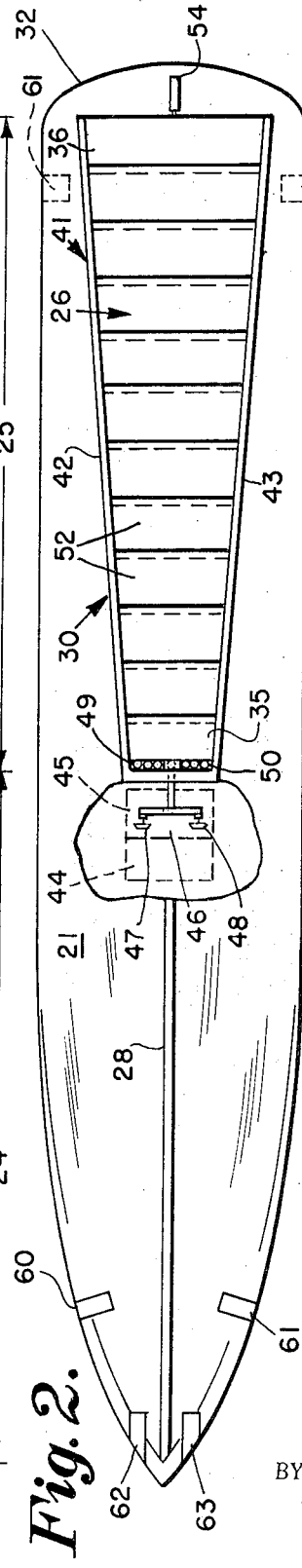
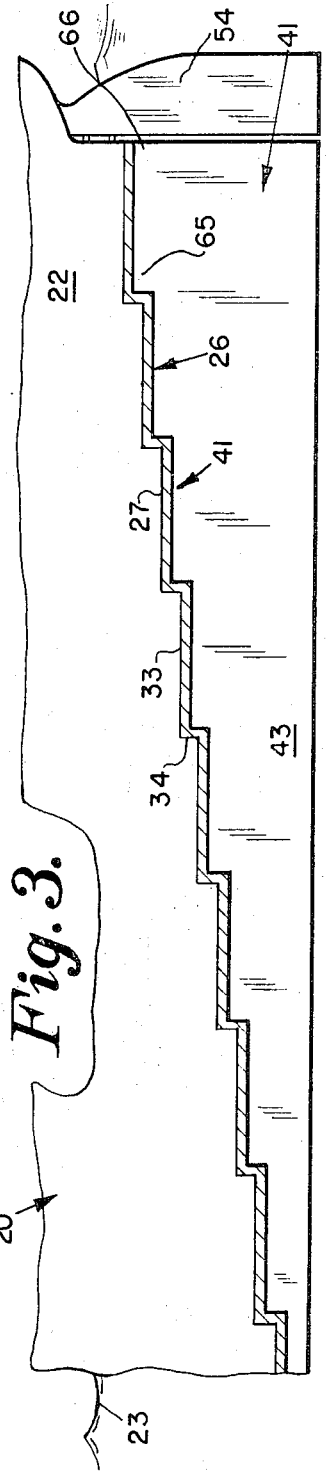
INVENTOR.
WILLIAM H. FULTON
BY
*Pearson + Pearson*
ATTORNEYS

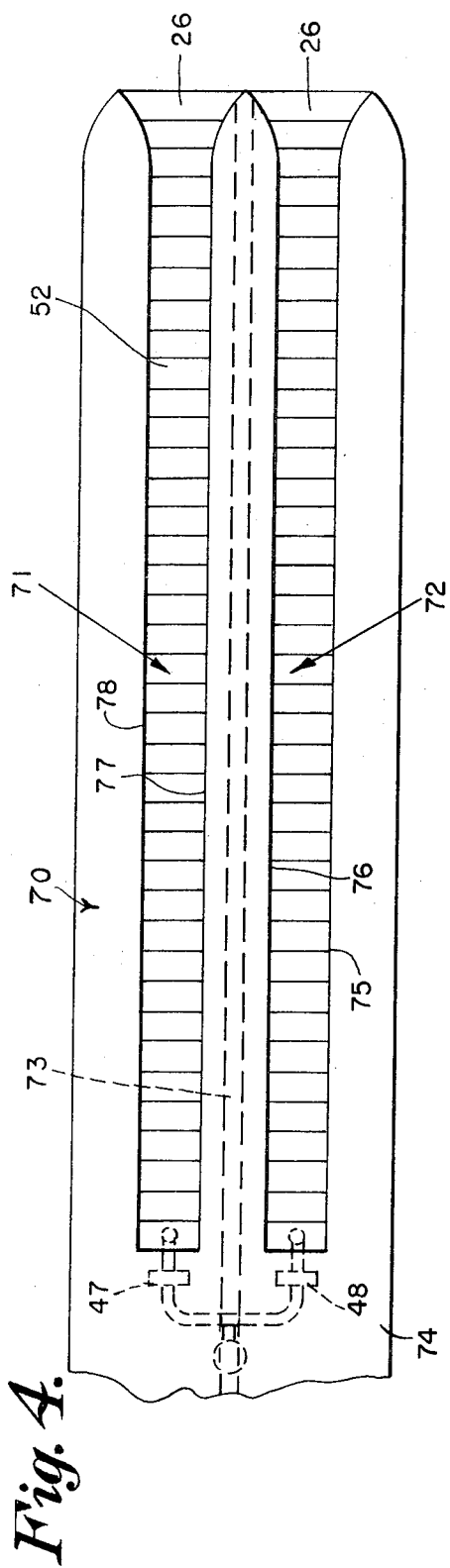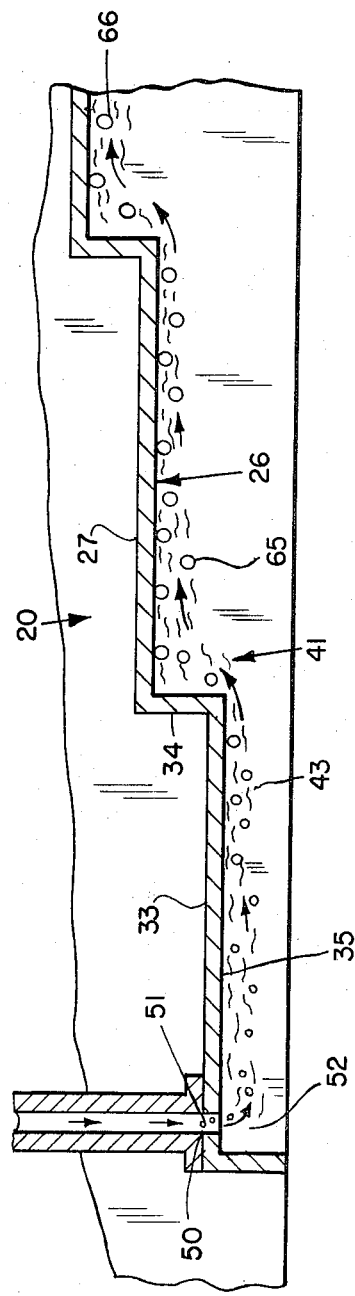

SHIP PROPULSION SYSTEM

PRIOR ART

The basic shape of the hull of a ship, whether large or small, has remained essentially unchanged through the ages, and whether driven by sail, engine, or oars, most ship hulls, under the water line, closely resemble a floating beam. In small motor boats, at least one forward facing step has been provided to permit the boat to plane, but such steps have not been part of the propulsion means and have been mainly for the purpose of reducing skin friction and water contact area.

In U.S. Pat. No. 187,742 to Whiting of Feb. 27, 1877, a serrated bottom for the hull of a vessel is disclosed in the form of a horizontal series of undulations, this configuration also being for the purpose of planing and having no connection with propulsion or thrust.

In U.S. Pat. No. 529,065 to Dodge of Nov. 13, 1894, a series of steps extend entirely around the hull horizontally except at the bow and stern where each step becomes an upwardly inclined plane to provide the sailing vessel with a lifting effect in contradistinction to a burying effect, and to provide a sail boat keel effect for preventing careening.

In U.S. Pat. No. 1,475,393 to Nachenius of Nov. 27, 1923, the possibility of propelling a vessel by air discharged below the water level is discussed and a hull with a substantially plane, upwardly inclined, stern face is taught for guiding the rising air bubbles. However, in the vessel disclosed, the air would apparently escape sidewise from under the hull and there are no upper wall, or side wall, boundary surfaces requiring any bubble thrust to be exerted rearwardly for propelling the vessel forwardly.

SUMMARY OF THIS INVENTION

In this invention, an elongated cargo, tanker, or passenger, type ship of substantial length, beam and draft, is provided with a series of horizontal tread, vertical riser, steps inclining upwardly from intermediate of the keel portion, at maximum draft, or hydraulic head to just below water level at the stern. The horizontal treads and vertical risers form boundary surfaces, as do longitudinally extending side walls, so that each riser can be considered a rearward facing piston head and each surge of rising water pressing on a bubble in a step can be considered a moving cylinder head following a compressible medium (the pocketed air) and exerting forward thrust on the riser.

An air compressor, or pump, suitable tanks, conduits, plenums or manifolds and suitable valves are provided to discharge air into the space, or pocket, defined by the lowermost step in the series. The side walls of the steps preferably diverge from each other from bottom to top so that a bubble filling the lowermost pocket exerts a predetermined forward thrust on the riser to propel the ship and then escapes to rise into the next pocket while expanding to exert a forward thrust on that riser. The bubbles thus advance upwardly, individually and successively, each expanding progressively and thrusting the ship forwardly until discharged from the top step when just below the water line at the stern.

BRIEF DESCRIPTION OF THE DRAWING

FIG. 1 is a diagrammatic side elevation of an elongated ship constructed in accordance with this invention;

FIG. 2 is a bottom plan view of the ship shown in FIG. 1;

FIG. 3 is an enlarged side elevation in section of the stern portion thereof;

FIG. 4 is a bottom plan view similar to FIG. 2, but on an enlarged scale showing a ship with a pair of spaced apart sets of steps; and FIG. 5 is a view similar to FIG. 3, much enlarged, showing diagrammatically the vertical laminar flow of the water and the venturi effect and bubble path of the air moving upwardly as the ship moves forwardly.

STATEMENT OF CALCULATIONS

In order to demonstrate this improvement over propeller driven ships that may be expected by use of this invention, it would seem desirable to start from data taken from an actual ship.

These specifications on the Mauretania are taken from the Encyclopedia Britannica:

| | |
|---|---|
| Length | 762.2 feet |
| Beam | 88.0 feet |
| Draft | 33.6 feet |
| Displacement | 42,000 tons |
| Speed | 26.06 knots per hour |
| Indicated Horse Power | 70,000 |

By definition, a foot pound is the force required to lift a weight of one pound, a distance of one foot. Also by definition, one horse power equals 550 foot pounds per second. Therefore, 70,000 horse power equals 38,500,000 foot pounds per second. One knot equals 6,080 feet. Therefore, ship travels:

$$26.06 \times 6,080 = 158,444.8 \text{ feet per hour.}$$

Therefore, ship travels:

$$158,444.8/3,600 = 44.012 \text{ feet per second.}$$

Thrust, by definition, equals pounds of force. Therefore, assuming 100 percent efficiency, the thrust required to drive the Mauretania as specified above equals:

$$38,500,000/44.012 = 874,761 \text{ pounds.}$$

Let it now be assumed that the entire power plant, including the propellers, be removed from the Mauretania and replaced by a recess within the lines of the original hull, open to the surrounding water on its bottom side and at the stern end, with side walls extending lengthwise from the forward end of the recess to the stern of the ship, and extending upward to meet the cover structure of the recess. The cover structure will consist of a series of risers and inverted treads as indicated in FIGS. 1 to 4 and, extending from the forward end of the recess to the stern, the lower edge of the forward riser to be flush with the bottom surface of the hull.

In the following computations, in order to make use of available tables and avoid the use of small decimals, these changes in Mauretania specifications have been made:

1. the pressure tables used apply to fresh water;
2. the draft is assumed to be 33.5 feet, instead of 33.6 feet;
3. the speed per second is assumed to be 44 feet, instead of 44.012 feet.

The effect of these errors appears to be insignificant if compared to the assumption of 100 percent efficiency of the propeller drive.

Assume that the cover structure for the recess is formed with fifty-five risers, each six inches high, and fifty-five associated treads.

Assume fore and aft length of uppermost tread = 24.8 ft

Assume length of other treads to be 8.8 feet each 54×8.8 = 475.2 ft Therefore, fore and aft length of recess = 500 ft The time required for water to rise six inches under a six inch head is derived as follows:

$V = \sqrt{2 gh} = \sqrt{2 \times 32.16 \times 0.5} = 5.671$ feet per second $T = 2 S/V = 2 \times 0.5/5.671 = 0.1763$ seconds (any stage). Therefore, the ship can advance $44 \times 0.1763 = 7.7572$ feet, while the water rises six inches.

STATEMENT A

It is now assumed that the pattern of the water-surface, which forms the boundary between the air and water, under each 8.8 foot tread is approximately the same.

Bernoulli's theorem teaches that the ratio of the change in volume from the lower to the upper step due to the change in pressure, is 1.668 to 1.

This ratio is obtained as follows:

| Pressure at bottom edge of bottom riser (33.5 ft.)= | 14.5232 | Pressure at bottom edge of top riser (6.5 ft.)= | 2.81794 |
| --- | --- | --- | --- |
| Barometric pressure | +14.7 | | +14.7 |
| Absolute pressure | 29.2232 | | 17.51794 |

$17.518 / 29.2232 = 1.668$ Ratio
length of top riser to bottom riser

It follows from Statement A above that this same ratio applies to the length of the risers across the recess, so that for each foot of length of the bottom riser, the length of the top riser will be 1.668 feet.

The average length of the series of fifty-five risers will be 1.334 feet for each foot of length of the bottom riser.

The area of the riser structure forming the boundary wall is 27.5 feet times 1.334 feet equals 36.685 square feet for each one foot length of the bottom riser.

STATEMENT B

The pressure in a confined volume of gas is uniform throughout and is exerted outwardly in a direction normal to the boundary surfaces.

Head in feet from the surface to the center line of the step structure covering the recess is 19.75 feet.

Equivalent pressure in pounds per square inch equals 8.6164.

The total thrust developed against the riser structure for each one foot length of the bottom riser equals:

$36.685 \times 144 \times 8.6164 = 45513$.

Required total thrust equals 874.761.

$874.761/45,513 = 19.2200$ feet equal required length of bottom riser. Adjust to 19.25 feet.

Bottom riser displacement per minute at speed of 44 feet per second equals:

$44 \times 60 \times 19.25 \times 0.5 = 25,410$ cubic feet per minute $60 \times 24 = 1,440$ minutes per day
$25,410 \times 1,440 = 36,590,400$ cubic feet per day = 36.6 million cubic feet of compressed air per day.

To deliver one million cubic feet of precooled compressed air per day at 14.7 pounds gage pressure per square inch requires ninety horse power (see Mark's Standard Handbook for Mechanical Engineers).

$90 \times 36.6 = 3,294$ horse power to provide thrust equal to the thrust delivered by 70,000 horse power by means of conventional propellers.

It will be understood that while for convenience and clarity the rate of flow of air discharged into space 52 is calculated to be constant and to continually resist the flow of water into said space, that actually the control means may be arranged to apply the air intermittently on a predetermined cycle for optimum efficiency.

In recent years, occasional reports have been received of mid-ship break-aparts with consequent loss of the ship and cargo and some of the crew members. Also in recent times, there is a definite trend toward the construction of larger and larger bulk cargo ships, especially oil tankers, where builders have been able to convince the buyers that substantial savings are obtainable if one 150,000 ton tanker replaces two 75,000 ton ships.

In the preceding calculations concerning the Mauretania, the resulting figures were based on the use of only a single recess. Several advantages will be apparent if the single recess is divided to form twin recesses, each five hundred feet long, and spaced apart with, of course, the two required additional side walls.

In this arrangement, space would be available for a "backbone" structure from prow to stern, designed to withstand any foreseeable strains that might be encountered in violent srorms.

If separate control of the volume of air delivered to each recess is provided, it should assure effective means for steering the ship without the use of a conventional rudder and the rugged associated control-mechanism that is required.

The elimination of the rudder would give the hull designer greater freedom in shaping the central area of the stern of the ship and establish more favorable conditions for the development of laminar flow in adjacent waters.

During the past century, several ships of the catamaran or twin hull type have been built. Contemporary reports agreed that these ships all had one characteristic in common, a remarkable degree of stability and freedom from excessive roll, even in heavy seas. It is believed that a ship with the twin recesses as described above will inherit some of this desirable characteristic.

In the foregoing calculation, the dimensions of the height of the risers and the length of the treads have been selected arbitrarily and maintained constant throughout the cover structure. This procedure was merely for the purpose of simplifying the presentation of the method and any variations from the above assumptions shall be considered as refinements within the scope of the invention and covered by the claims appended hereto.

DESCRIPTION OF THE ILLUSTRATED EMBODIMENT

In the ship 20 illustrated, the bottom 21 of the hull 22, below the water line 23, remains unchanged in the forward portion 24 of vessel, or ship, 20. In the rearward portion 25, however, the bottom 21 of hull 22 includes thrust propulsion means 30, the bottom being formed with a series 26 of transverse steps, such as 27, inclining upwardly from intermediate of the keel 28, or midsection, at the bottommost, full or maximum draft level 29 to a minimum draft level 31 just below the water line 23 proximate the stern 32.

The steps 27 each include a horizontal tread 33 and a vertical riser 34, which treads are preferably identical in length and which risers are preferably identical in height for the full length of the stairway 26, but preferably, the steps diverge outwardly in width from the lowermost step 35 to the uppermost step 36, as determined by the application of Bernoulli's theorem.

Side wall, or boundary surface means 41 is provided in the form of a vertical side wall 42 or 43, extending along each opposite side of the series 26 of steps. The side walls 42 and 43 diverge outwardly and rearwardly as shown, and prevent sidewise escape of air from the ends of the stairs 27, thereby assuring that air bubbles 65 discharged at the lowermost step 35 will travel up the steps for discharge at 66 at the upper level 31. It will be understood that the pressure of the air is always normal to the boundary surface.

Motor 44 drives a low pressure air compressor, or pump, 45 of commercially available type to supply air conduits 46, valves 47 and 48, and plenum, or manifold, 49 and 50, delivering air into a narrow slot-like orifice 51 in the space 52 defined by the bottommost step 35.

A conventional rudder 54 may be provided, but the ship 20 may also be steered by suitable control means such as valves 47 and 48 for discharging air intermittently or continuously and/or jointly to propel the ship forwardly or to discharge air on one side only of the steps 26 to steer the ship.

Suitable side-discharge water jets 60 and 61 may be provided to ease the ship into a dock and suitable forward-discharge water jets 62 and 63 may be used to check or reverse the ship's forward motion during docking operations.

Each cover structure includes a plurality of recesses, steps, or pockets 52, each recess 52 being open to the water surrounding the hull on its base side and at its stern end. Each recess 52 includes an upper side wall, formed by a tread 33, and port and starboard side walls 42 or 43 extending from the cover structure to the hull, the boundary surfaces of each recess having fluid-tight connections along the intersecting lines thereof.

In the ship 70, illustrated in FIG. 4, twin recesses 71 and 72 are provided each on an opposite side of a backbone 73 within the hull 74 and each having boundary surfaces, or side walls, 75 and 76 or 77 and 78 to prevent sidewise escape of air. Separate control of air to each recess 71 and 72 is provided by valves 47 and 48, for steering the ship.

What is claimed is:

1. In combination with an elongated ship having a hull of predetermined length, beam and draft:
   thrust propulsion means comprising a plurality of transversely extending steps rising upwardly and diverging progressively in width, from proximate full draft depth intermediate of the length of said ship to just below the water line proximate the stern of said ship, said means including boundary surfaces extending longitudinally along each opposite side of said rising divergent steps to prevent sidewise escape of air therefrom, and
   powered air pressure means on said ship including conduit means for delivering air under pressure into the space defined by the lowermost step to propel said ship forwardly and then rise to each succeeding step, while expanding and continuing to exert forward thrust to propel said ship.

2. A combination as specified in claim 1, wherein:
   said plurality of steps comprises risers and treads of substantially identical length and height but of progressively increasing width from bottom to top,
   and wherein said air pressure means supplies air intermittently under pressure to said lowermost space, whereby said air expands from step to step upwardly, thereby producing effective thrust on each riser in turn despite progressively reduced hydraulic head in travelling up said inclined series of steps.

3. A combination as specified in claim 1, wherein:
   said plurality of steps comprises an identical pair thereof, each separated from the other and on an opposite side of said hull, and
   said air supply means includes an air pump, a pair of plenums each connected to one of said pair of steps and valve means for controlling delivery of air to said plenums to steer said vessel.

4. A combination as specified in claim 1, wherein:
   said plurality of steps in proportion to the dimensions of a typical vessel of seven hundred fifty foot length, ninety foot beam and thirty-three foot draft, is dimensioned with about sixty treads, each about eight feet long, having risers each about six inches in height and said risers and treads increasing in width from about thirty feet at the bottom to about fifty feet at the top.

5. A combination as specified in claim 1, wherein:
   said power air pressure means includes control valve means in said conduit means for applying said air under pressure, intermittently to the lowermost said space, proximate said hull bottom,
   and includes a narrow slot-like orifice for applying said air into the upper forward portion of said lowermost space for relative movement in a sternward direction, unobstructed by nothing but water.

6. An elongated ship having a hull bottom formed with a longitudinal series of horizontal tread, vertical riser, steps, said series of steps having boundary surface means extending longitudinally on each opposite side thereof to prevent sidewise escape of air and said series inclining upwardly and diverging outwardly from proximate the bottom of said ship, intermediate of the length thereof, to proximate the stern, just below the water line thereof;
   and pressurized air supply means on said ship delivering compressed air into the space defined by the lowermost step of said series for propelling said ship forwardly, said air then rising progressively to the succeeding steps while expanding and continuing to exert thrust for propelling said ship forwardly.

7. An elongated ship having a major portion of its hull bottom below the water line, formed with a multiplicity of transversely extending steps inclining upwardly and diverging outwardly from the lowermost portion of said hull to proximate the stern thereof, said steps having boundary surfaces along each opposite side thereof to prevent sidewise escape of air, and air pressure supply means on said vessel for discharging compressed air into the lowermost said step to form air pockets, or bubbles, travelling individually and successively step by step up to just below the water line proximate said stern while expanding and propelling said vessel forwardly.

* * * * *